United States Patent [19]
Thompson et al.

[11] 3,910,224
[45] Oct. 7, 1975

[54] FAILSAFE DEVICE
[76] Inventors: Hugh A. Thompson, 5325 Pyrtania, New Orleans, La. 70115; F. Michael Bauer, Jr., 6409 Ithaca, Metarie, La. 70002
[22] Filed: Oct. 23, 1973
[21] Appl. No.: 408,316

[52] U.S. Cl........... 116/114 R; 73/67.3; 116/114 D; 116/114 AC
[51] Int. Cl.².......................................... G01N 3/00
[58] Field of Search..... 116/114 R, 114 D, 114 AC; 73/67.3, 67.4, 91, 70; 340/261; 200/61.08

[56] References Cited
UNITED STATES PATENTS
3,020,452   2/1962   Tudbury ................................ 73/70

Primary Examiner—S. Clement Swisher
Assistant Examiner—Denis E. Corr
Attorney, Agent, or Firm—Pravel & Wilson

[57] ABSTRACT

Failsafe device providing warning of impending failure of any member subject to such failure such as machine parts, electrical power transmission lines, structural members, utility pole arms, and the like, including a housing attached to the member; and a warning bar mounted in the housing for movement to a warning position prior to fatigue failure of the member.

7 Claims, 4 Drawing Figures

U.S. Patent  Oct. 7, 1975  3,910,224
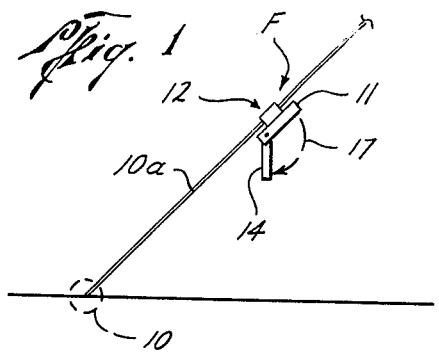
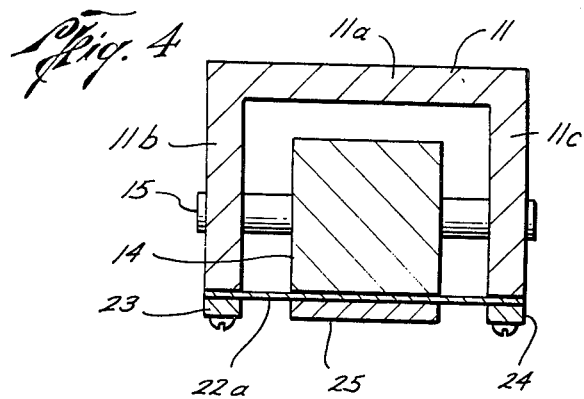
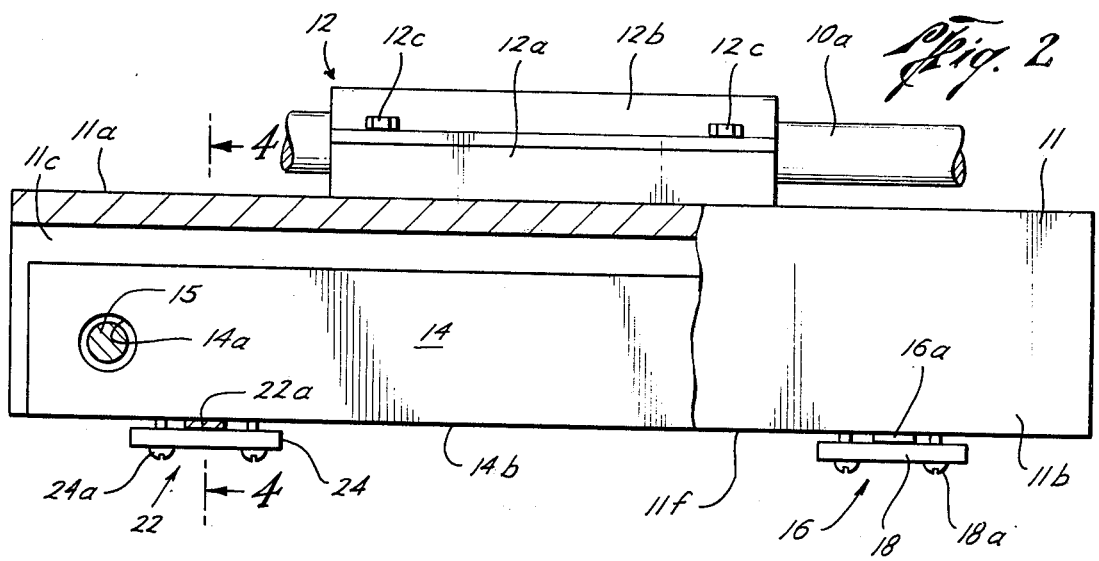
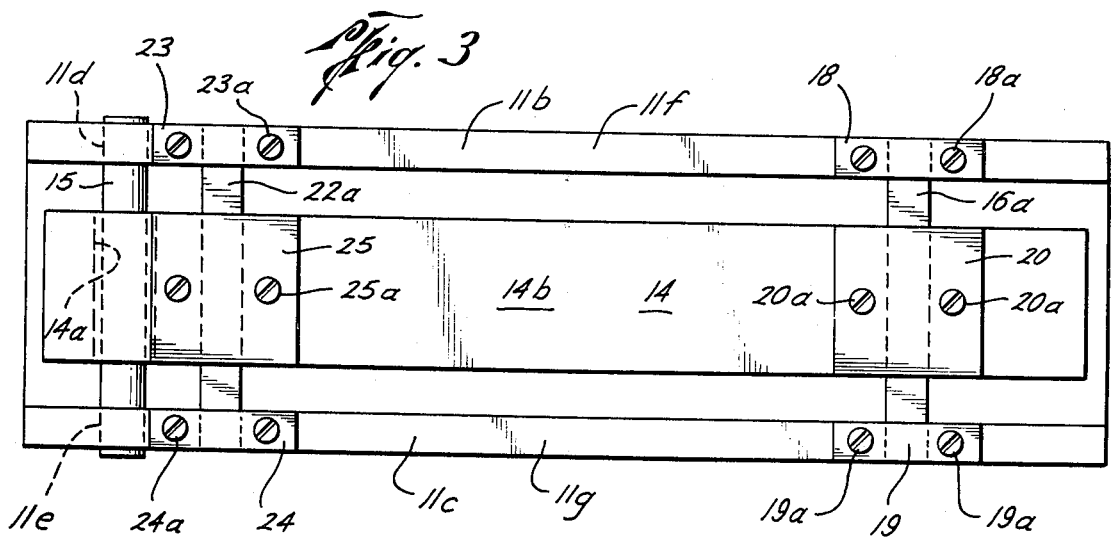

FAILSAFE DEVICE

Background of the Invention

The field of this invention is failsafe devices providing warning of impending failure of any member.

Many structural members, power transmission lines, and machine parts are subject to cyclic stresses that lead to fatigue failure. If such a failure occurs in a critical member, the member may fracture completely and catastrophic failure of the structure, machine or wire may result.

Summary of the Invention

It is an object of this invention to provide a new and improved failsafe device for providing a warning of impending failure of any member such as a structural member, wire, or machine part in order to prevent ultimate failure of same and possible damage and personal injury. The failsafe device of the preferred embodiment of this invention includes a housing which is clamped to a member and warning means are mounted in the housing for movement between normal and warning positions. A failsafe means is provided for supporting the warning means in the normal position and for releasing the warning means for movement to a warning position prior to failure of the structural member from cyclic stresses such as fatigue stresses. The failsafe means includes a failsafe member which is attached to the housing in position to support a warning bar. The failsafe member has a fatigue or endurance limit that is less than the endurance limit of the member to which it is attached such that the failsafe member will fail from fatigue stresses prior to failure of the member itself. Failure of the failsafe member and release of the warning bar will bring the impending failure of the member to the attention of an observer so that the member can be strengthened or removed before ultimate failure.

Brief Description of the Drawings

FIG. 1 is a schematic view of the failsafe device of the preferred embodiment of this invention in position to provide a warning of impending failure of the arm of a utility pole;

FIG. 2 is a side view partly in sections of the failsafe device with the warning bar in the normal, supported position;

FIG. 3 is a bottom view of the failsafe device in the normal position; and

FIG. 4 is a sectional view taken along line 4—4 of FIG. 2.

Description of the Preferred Embodiment

Referring to the drawing, the letter F generally designates the failsafe device of the preferred embodiment of this invention for providing a warning signal of impending failure of a member such as an arm 10a of a utility pole illustrated schematically at 10.

The failsafe device F includes a U-shaped housing 11 which is mounted for vibration with the pole arm 10*1* by a clamp means generally designated by the number 12. The housing 11 is a U-shaped channel which includes a top portion 11*1* and opposing side portions or walls 11b and 11c. The side wall 11b has bottom edge 11f and the side wall 11c has a bottom edge 11g. The housing 11 may be made of any suitable material such as aluminum, so long as such material is very weather resistant.

The clamp means 12 includes a bottom, flanged semi-cylindrical clamp member 12a which is welded or otherwise attached to the top housing portion 11a. The clamp means 12 further includes a top, flanged semi-cylindrical clamp member 12b that is adapted to be mounted over the pole arm 10a in alignment with the bottom clamp member 12a such that bolts such as 12c can be utilized to attach the top and bottom clamp members 12b and 12a, respectively, together. In this manner, the clamp means 12 serves to mount the housing 11 onto the pole arm 10a such that the housing 11 is subject to the same vibratory, cyclic forces as the pole arm 10a. This is accomplished by making the inner diameter of the cooperating, semi-cylindrical clamp members 12a and 12b substantially equal to the diameter of the pole arm 10a such that the clamp members 12a and 12b mount very tightly over the pole arm 10a.

A warning bar 14 is mounted between the opposing housing side walls 11b and 11c for movement between the normal position of FIGS. 2–4 and the released, warning position of FIG. 1 in order to provide a warning signal to an observer of the impending failure of the pole arm 10a. The warning bar 14 is positioned between the opposing side walls 11b and 11c and is generally square in cross-section as viewed in FIG. 4. The warning bar may be made of steel or other suitable material of predetermined weight and length. The warning bar 14 has an opening 14a therethrough which is adapted for alignment with openings 11d and 11e in the opposing housing side walls 11b and 11c, ,respectively. respectively.

A pin or shaft 15 extends through the housing side wall opening 11e, the warning bar opening 14a and the other housing side wall opening 11d in order to mount the warning bar 14 for movement between the normal position of FIGS. 2–4, wherein the warning bar is positioned substantially within the housing 11, and the release, warning position illustrated in FIG. 1, where the warning bar 14 is released outwardly to an exposed position.

A failsafe means generally designated by the number 16 is provided for supporting the warning bar 14 in the normal position and for releasing the warning bar for movement under the force of gravity in the direction of arrow 17 outwardly of the housing 11 prior to failure of the pole arm 10a from exposure to the cyclic stresses of fatigue. The failsafe means 16 includes a failsafe plate or bar 16a mounted onto the bottom of the housing 11 in order to support the warning bar 14 in the normal position. A mounting plate 18 is attached to the bottom housing wall edge 11f by screws 18a for supporting the failsafe member 16a against the bottom housing edge 11f. Similarly, a mounting plate 19 holds the other end of the failsafe member 16a against bottom housing side wall edge 11g of the side wall 11c. The mounting plate 19 secured by screws 19a holds the failsafe member 16a in position. The failsafe member 16a is also attached to the bottom 14b of the warning bar 14. A mounting plate 20 holds the failsafe member in position against the bottom 14b of the warning bar by means of screws 20a. Thus, the mounting plates 18–20 serve to mount the failsafe member 16a onto the bottom of opposing side walls 11b and 11c in position to support the warning bar 14.

The cyclic stresses which the pole arm 10a are subjected to are transferred through the clamp members 12a and 12b, the housing top portion 11a, the housing side walls 11b and 11c to the failsafe member 16a. The mounting plates 18–20 serve to maintain the failsafe member in sufficient contact with the bottoms of the side walls so that the cyclic stresses which the pole arm 10a is subjected to are transferred to the failsafe member 16a. The failsafe member 16a has a fatigue endurance limit which is actually less than the fatigue endurance limit of the pole arm 10a itself. Thus, the failsafe member 16a will fracture and fail before the pole arm 10a will fail.

A support means generally designated as 22 is provided for supporting the mounting shaft 15 in position to prevent the mounting shaft 15 from dampening the transfer of cyclic stresses between the pole arm 10a and the failsafe member 16a. The support means 22 is quite similar in structure to the failsafe means 16. As best illustrated in FIGS. 3 and 4, the support means 22 includes a support member 22a that is mounted onto the bottom housing side edges 11f and 11g in order to support the warning bar 14 in a position such that the mounting shaft 15 does not engage any part of the warning bar at the opening 14a.

The support plate 22a is attached to the bottom edge 11f of the housing side wall 11b by a mounting plate 23 which utilizes screws 23a to hold the support plate in position against such bottom edge. Similarly, a mounting plate 24 is attached to the bottom edge 11g of bottom side wall 11c by means of screws 24a in order to mount the support plate 22a against the housing 11.

A third mounting plate 24 is attached to the bottom 14b of the warning bar 14 in order to hold the support member 22a in engagement with the warning bar 14. Screws such as 24a are utilized to maintain the support member 22a in engagement with the warning bar bottom 14b. The material and size of the support member 22a is chosen such that the fatigue limit of the support member 22a is substantially the same as the fatigue limit of the failsafe member 16a. In this manner, both of the members 16a and 22a supporting the warning bar 14 will fail prior to failure of the pole arm 10a so that the warning bar 14 will be released to pivot outwardly to the position of FIG. 1 in order to warn an observer of the impending failure of the pole arm 10a. The size and material for the support member 22a is also chosen such that the support member 22a will be sheared whenever the failsafe member 16a fails. In this manner, the warning signal is totally correlated to failure of the failsafe member 16a. Therefore, the fatigue limit of the failsafe member 16a is actually designed and chosen so that only the member 16a need fail prior to the failure of the pole arm 10a in order to allow for the release of the warning bar 14. Thus, when the failsafe member 16a fails, the additional weight on the support member 22a causes the support member 22a to fail thereby allowing the warning bar 14 to pivot outwardly to the warning position. The support member 22a supports the warning bar in such a position that the mounting shaft 15 extending through the opening 14a in the warning bar 14 does engage the sides of the openings 11d and 11e in the housing side walls 11b and 11c, respectively. In this manner, no cyclic stresses are transferred from the housing through the shaft 15 to the warning bar 14. The shaft 15 does not interfere with the transfer of the cyclic stresses from the pole arm 10a through the clamping member 12a to the housing 11 and finally to the failsafe member 16a. Of course, the diameter of the openings 11d and 11e of the side walls 11b and 11c, respectively, are substantially the same diameter as the shaft 15 in order to allow the shaft 15 to be centered within but without contacting opening 14a which has a greater diameter than the diameter of the shaft 15 as shown in FIGS. 2 and 3. Alternatively, the opening 14a could be substantially the same diameter as the shaft 15 with the openings 11d and 11e having a greater diameter than the diameter of the shaft 15.

Thus, the failsafe device F of this invention may be mounted onto a utility pole arm 10a in order to provide a warning of impending failure of the pole arm. Such utility poles and pole arms 10a are subjected to cyclic stresses throughout their life. Eventually, the cyclic stresses will cause fatigue fractures and failures within the pole and pole arm 10a. Because it is very dangerous to allow a pole arm 10a to crash to the ground in failure, it is desirable to be warned of such failure in time to replace the pole or the pole arm 10a.

The failsafe device F of the preferred embodiment of this invention is mounted onto the pole arm 10a in order to provide a warning signal of the impending failure by fatigue fracture of the pole arm 10a. The material and size of the failsafe member 16a is designed and chosen such that the fatigue limit of the member 16a is less than the fatigue limit of the pole arm 10a so that the failsafe member 16a will fail before the pole arm 10a. Upon failure of the failsafe member 16a, the additional weight on the warning bar 14 will cause the support member 22a to shear thereby allowing the warning bar to pivot outwardly of the housing 11 in the direction of arrow 17, under the influence of gravity, in order to provide a warning to an observer on the ground.

Any suitable materials may be utilized to accomplish and provide members having the necessary strengths and fatigue limits called for herein. For example, the housing 11 may be made of aluminum in order to be very weather resistant and the warning bar 14 may be made of steel in order to provide sufficient load onto the failsafe member 16a . The failsafe member 16a is chosen in material and size in order to provide a suitable endurance limit less than the endurance limit of the utility pole arm 10a.

The foregoing disclosure and description of the invention are illustrative and explanatory thereof, and various changes in the size, shape, and materials as well as in the details of the illustrated construction may be made without departing from the spirit of the invention.

While the present invention has been disclosed herein in conjunction with a utility pole structure, the invention is not so limited as our invention may be used with any member subject to fatigue failure.

We claim:

1. A failsafe device providing warning of impending failure of a member subject to fatigue stresses, comprising:
    a member that is subject to the vibration of fatigue stress;
    a housing;
    clamp means for clamping said housing for vibration with said member;

warning means mounted in said housing for movement between a normal position and a warning position;

failsafe means for supporting said warning means in said normal position and for releasing said warning means for movement to said warning position prior to failure of said member;

said housing having opposing side walls;

said warning means being a warning bar mounted for movement between said normal position, in which said warning bar is positioned between said side walls, and a warning position, in which said warning bar is positioned outwardly of said side walls;

said housing side walls having aligned openings therein and said warning bar having an opening therein;

a shaft extending through said aligned openings in said housing side walls and said warning bar; and said shaft being positioned out of engagement with said warning bar.

2. The structure set forth in claim 1, wherein said failsafe means includes:

a failsafe member attached to said housing, said failsafe member being designed to fail at a failsafe fatigue limit.

3. The structure set forth in claim 2, inlcuding:

said failsafe fatigue limit being less than the fatigue limit for said member whereby said warning means moves to said warning position prior to fatigue failure of said member.

4. The structure set forth in claim 1, including:

support means supporting said warning bar in position to prevent transfer of vibration from said shaft to said warning bar.

5. The structure set forth in claim 4, including:

said support means including means releasing support of said warning bar upon releasing of said warning bar by said failsafe means.

6. The structure set forth in claim 1, wherein:

said member is the arm of a utility pole.

7. The structure set forth in claim 1, including:

said housing being U-shaped in configuration.

* * * * *